United States Patent [19]

Dowden

[11] Patent Number: 4,685,851
[45] Date of Patent: Aug. 11, 1987

[54] RAIL CAR TIPPLERS AND TIPPLER INSTALLATIONS

[75] Inventor: Paul J. Dowden, Westbury on Trym, England

[73] Assignee: DRG(UK) Limited, Bristol, England

[21] Appl. No.: 675,398

[22] Filed: Nov. 27, 1984

[30] Foreign Application Priority Data

Nov. 28, 1983 [GB] United Kingdom ............... 8331736

[51] Int. Cl.⁴ ............................................. B65G 67/54
[52] U.S. Cl. ................................. 414/361; 414/360;
414/578; 414/581; 414/576; 414/766
[58] Field of Search .............. 414/359, 360, 361, 371,
414/576, 581, 372, 419, 421, 764, 765, 766, 758,
578

[56] References Cited

U.S. PATENT DOCUMENTS

| | | |
|---|---|---|
| 1,655,801 | 1/1928 | Strauss . |
| 2,542,660 | 2/1951 | Glover ............................... 414/361 |
| 2,826,315 | 3/1958 | Fujishige ............................ 414/359 |
| 3,811,580 | 5/1974 | Sheppard ........................... 414/361 |

FOREIGN PATENT DOCUMENTS

| | | |
|---|---|---|
| 304478 | 1/1929 | United Kingdom ............... 414/371 |
| 438157 | 11/1935 | United Kingdom ............... 414/360 |
| 453487 | 9/1936 | United Kingdom ............... 414/360 |
| 623252 | 5/1949 | United Kingdom ............... 414/360 |
| 788065 | 12/1957 | United Kingdom ............... 414/359 |
| 802172 | 10/1958 | United Kingdom ............... 414/359 |
| 1168748 | 10/1969 | United Kingdom . |

*Primary Examiner*—Frank E. Werner
*Attorney, Agent, or Firm*—Cushman, Darby & Cushman

[57] ABSTRACT

A rail car tippler installation has an open-sided tippler with a rotatable structure (8) comprising a main longitudinal beam (16) mounted on end pivots (10, 18), said beam supporting a rail car platform (2) that substantially spans the distance between the end pivots. The main beam carries the weight of the rail car and platform during tipping and has pivot supports (30) for clamping beams (34) that are displaceably lockable to hold the rail car on the platform. The tipping axis is laterally offset from the platform in a manner that reduces the sweep radius of the tippler and the rise of the rail car during tipping. The installation includes a hopper (14) that is offset laterally oppositely to the tipping axis and has an entry opening that extends longitudinally as far as the end pivots.

13 Claims, 5 Drawing Figures

RAIL CAR TIPPLERS AND TIPPLER INSTALLATIONS

BACKGROUND OF THE INVENTION

This invention relates to tipplers for rail cars and to receiving and storing installations incorporating such tipplers.

Rail car tipplers are known for the discharge of bulk materials from a rail car into a hopper by tipping the rail car about a longitudinal axis. Such tipplers comprise a rotary structure on which the rail car is held as it is inverted to empty its contents. The structure has transverse frames of arcuate or circular form through which it is mounted on rollers, and clamping means that keep the rail car firmly in place as it tips with the rotation of the structure on the rollers.

When the transverse frames are in the form of rings the hopper into which the car contents are tipped must be disposed completely below the level of the tippler, which can require a great deal of expense in excavation and the provision of foundations. The charging means that brings each rail car onto the tippler platform must be a vehicle that can be driven on and off the platform, usually between the rails of the track, which introduces further complications and also means that the cars can be moved only slowly so that the cycle time is increased. Furthermore, it is not possible to provide a static weighbridge for rail cars on the tippler so it becomes difficult and complicated to get reliable weight data.

To avoid such problems as these, open-sided tipplers have been constructed having arcuate transverse frames which allow the use of a side-arm charger running on a track outside the tippler but require a substantially heavier structure to provide the necessary strength and they are therefore larger and more expensive to produce. One known form of open-sided tippler is substantially little mor than the modification of the first described form of tippler in which the transverse rings of the structure are open-ended and so it shares the other disadvantages of that first form of tippler. Another form of open-sided tippler comprises a pair of opposite end plates between which the hopper is situated to one side of the tippler, the end plates being connected together by a first beam against which the side of a rail car rests as it is being tipped, and a further beam on which a series of transverse top clamping beams are pivotally supported to hold the rail car in place when it is inverted. The two end plates also carry toothed racks which are both engaged by the rotary drive means to synchonize the movement of the end frames as the rail car is tipped.

This form of tippler can employ a side-arm charger, and the hopper need not be placed completely below the tippler structure, but the arrangement has a number of disadvantages, however. The tippler structure must be larger and heavier, so that its constructional costs are greater. In addition, the re-positioning of the hopper results in the rail cars being lifted a considerable distance through an arcuate path and their weight must be at least partly balanced by ballast, both these factors requiring larger driving forces, with further constructional and operating costs.

An object of the present invention is to provide an open-sided rail car tippler in which these disadvantages are at least partly avoided.

SUMMARY OF THE INVENTION

According to one aspect of the present invention, there is provided an open-sided rail car tippler comprising a rail car platform disposed in a tipping structure comprising a main longitudinal beam mounted at its opposite ends on respective pivot mountings supporting the structure rotatably for tipping the platform with a rail car on it, said main beam transmitting the weight of the structure and rail car to said mountings, top clamping means for holding the rail car on the platform when the tipped, said main beam carrying the clamping means through pivot supports fixed to the main beam to define an axis disposed above the axis of the main beam end pivot mountings when the tippler is at rest.

With this arrangement the main longitudinal beam serves as a load-carrying member both in the rest and tipped positions of the tippler.

According to another aspect of the invention, there is provided an open-sided rail car tippler having a rail car platform disposed in a tipping structure mounted at its opposite ends on respective pivot mountings for tipping the platform with the rail car on it, said tipping structure comprising a main beam extending between said pivot mountings, top clamping means on said structure for holding the rail car on the platform when it is tipped comprising a plurality of top clamping beams mounted on the main beam to be pivotable thereon about an axis parallel to the tipping axis, and the rail car platform substantially spanning the distance between said end pivot mountings.

Such a construction allows the tippler to be of a smaller size for a given size of rail car, with resulting savings in construction and operating costs.

According to a further aspect of the invention, there is provided an open-sided rail car tippler comprising a platform provided with rails for a rail car and disposed in a tipping structure mounted at its opposite ends on respective pivot mountings defining a longitudinal pivot axis for tipping discharge of a rail car on the platform, the tipping axis defined by said mountings being laterally offset from the rail car platform and being so located that a plane containing it and passing through the plane of the platform rails at its intersection with a vertical from the further lateral edge of the platform subtends an angle from the horizontal not substantially more than 30°, and preferably less than 20°.

This arrangement allows the sweep radius of the tippler to be kept at a minimum when the rail car is being tipped, so that the side arm charger can be located closer to the track on the rail car platform. The size, and therefore the cost of the charger arm can be significantly reduced and the reduced size of the arm can also lead to faster operating times because of the smaller distance it has to move when engaging with and disengaging from a rail car.

According to yet another aspect of the invention, there is provided a rail car tippler installation comprising an open-sided rail car tippler having a rail car platform disposed in a structure supported at longitudinally opposite ends on pivot mountings that define a tipping axis for the structure laterally offset from said platform, and a hopper for the discharge from said tippler disposed to the opposite side of said tipping axis to that of the rail car platform when at rest, the hopper having an entry opening extending longitudinally of the tippler as far as said pivot mountings.

BRIEF DESCRIPTION OF THE DRAWINGS

The invention will be described by way of example with reference to the accompanying schematic drawings, in which.

DESCRIPTION OF THE PREFERRED EMBODIMENT

Figure 1:
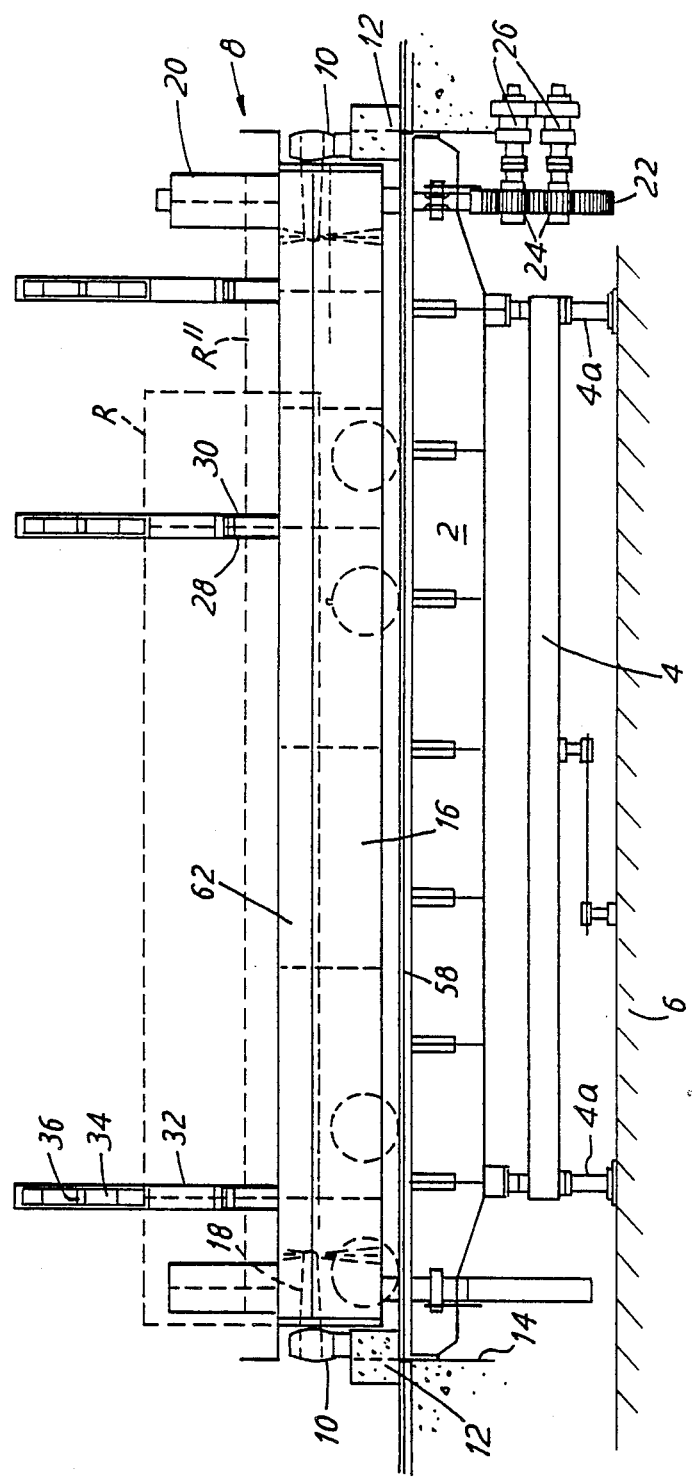
FIGS. 1 and 2 are side and end views of a tippler according to the invention.
Figure 2:
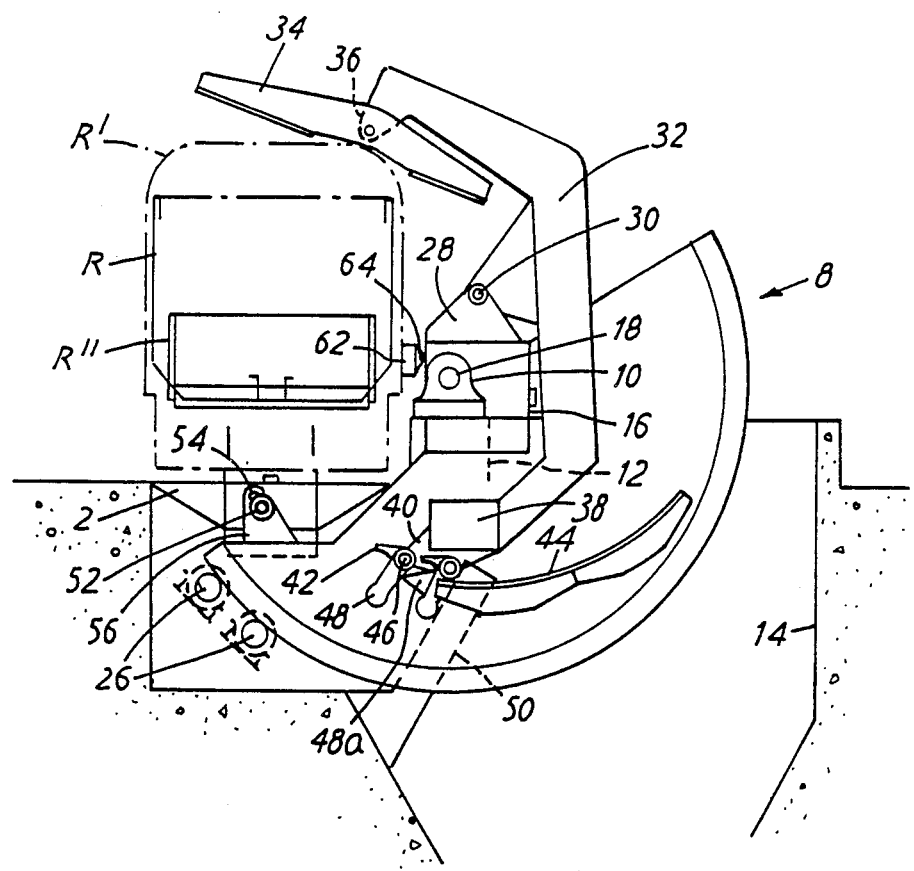

The tippler comprises a rail car platform 2 which, in the rest position shown in FIGS. 1 and 2, is supported by a weighbridge 4 comprising load cells 4a set on a fixed foundation 6. The tippler further comprises a rotatable tipping structure 8 mounted on bearing blocks 10 on fixed foundations 12 at opposite ends of the tippler. These foundations overhang the ends of the entry opening of a hopper 14 into which the rail cars are discharged by the tippler.

The rotary tipping structure comprises a main box beam 16 which extends between the bearing blocks 10 and stub shafts 18 project from its ends to be journalled in the blocks. An arcuate end plate 20 is fixed to each end of the beam, one of the end plates carrying an arcuate toothed rim 22, with a centre coincident with the tipping axis of the bearing blocks, engaged by drive pinions 24 of a pair of motors 26 (electric or hydraulic) that provide the rotary drive for tipping the rotary structure on its bearing blocks 10. It is also possible to provide both end plates with toothed racks for the rotary drive.

Brackets 28 project from the top of the beam to provide pivots 30 for respective carriers 32 on the upper ends of which transverse clamping beams 34 are suspended through pivots 36. The carriers are interconnected by a cross-member 38 that lies between the end plates 20 and that has end flanges 40 on each of which are mounted a pair of pawls 42. On the adjacent face of each end plate is an arcuate rack 44, having a centre coincident with the carrier pivots 30, for engagement by the pawls. Each pawl is fixed to a pivot pin 46 journalled in its end flange 40 and the pins also have weighted arms 48 fixed to them so that the pawls are pivoted with the tilting of the structure 8 on the end bearing blocks 10. The carrier and clamping beam assembly is so ballasted that, in the rest position shown in FIG. 2, a fixed abutment bar 50 at each end of the tippler engages one of the pawl pivot pins and thus holds the carriers 32 with the clamping beams 34 raised to the position illustrated.

The rail car platform is connected to the main rotary structure of the tippler by rollers 52 mounted on axially projecting pins at opposite ends of the platform, the rollers engaging in slots 54 in brackets 56 on the end plates. In the rest position shown in FIGS. 1 and 2, the rollers are clear of the ends of the slots and the platform is supported wholly by the weighbridge 4. The ends of the platform extend over the end plates 20 so that the platform spans the distance between the outer faces of the pivot bearing blocks 10.

Figure 3:
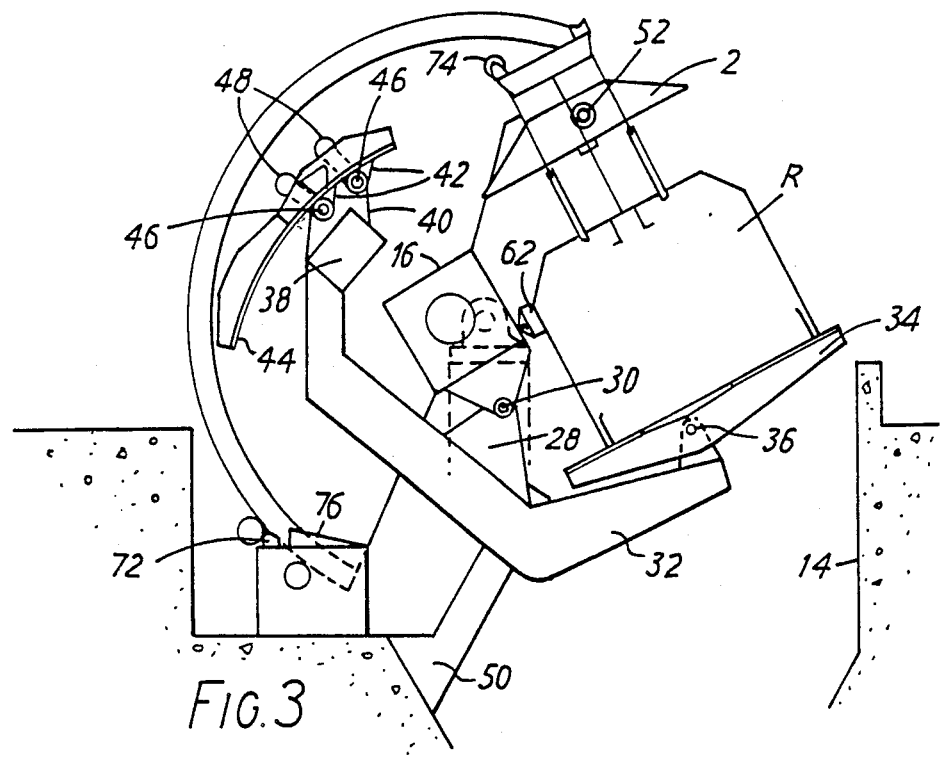
FIGS. 3 and 4 are end views showing the tippler of FIGS. 1 and 2 holding different patterns of rail car fully tipped.
Figure 4:
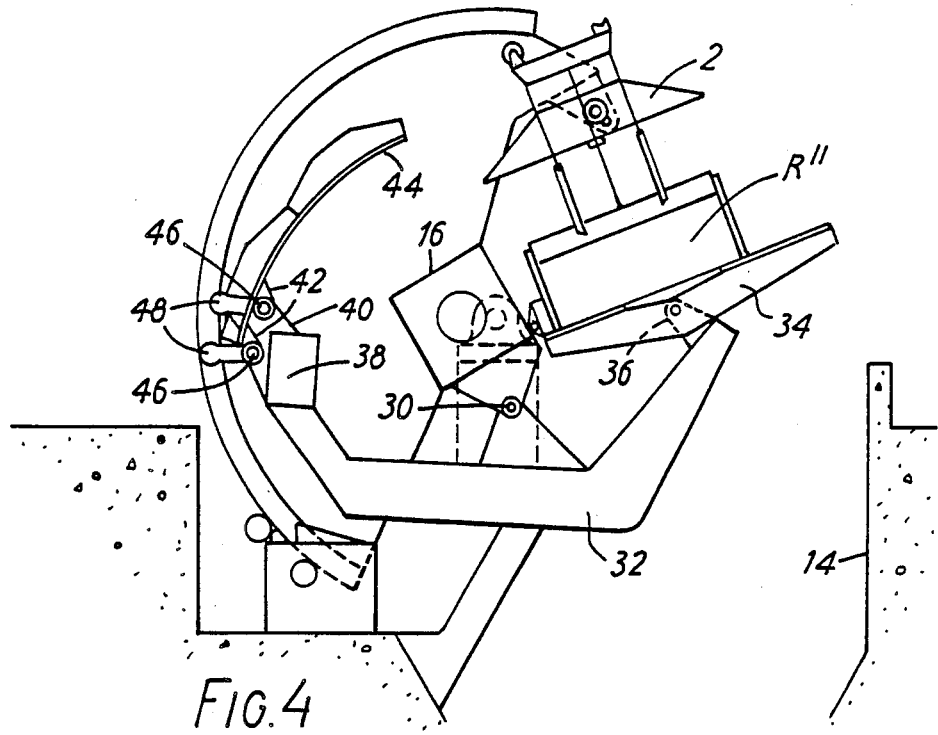

In operation, a loaded rail car R is driven onto the rails 58 of the rail car platform in a conventional manner, e.g. using a side-arm charger (not shown). The loaded weight can be measured and recorded, using the weighbridge, before the tippler motors 26 begin to tip the rotary structure clockwise (as seen in FIGS. 2-4), with the rail car on it.

The initial movement brings the ends of the slots 54 against the rollers 52, and the platform is then supported by and moves with the rotary structure. As tipping proceeds, the side of the rail car comes to rest against a buffer bar 62 pivoted on the main beam on an axis 64 parallel to the tipping axis. During this movement the carriers 32 and clamping beams 34 will have remained substantially as shown in FIG. 2, their positions being determined by the fixed abutments 50 engaging the pawl pivot pins 46, and the pivot connections 30 with the main beam, the latter undergoing a small displacement with the tipping of the main structure. At the same time the rail car is being lifted and tilted, and the top of the car is thus brought against the clamping beams 34 which then hold the rail car firmly on the platform 2 as tipping proceeds.

Upon the engagement of the clamping beams, the carriers 32 begin to pivot with the main structure and the pawl pivots 46 move away from the fixed abutment bar 50. As tipping continues, the weight arms 48 of the pawl pivot pins swing the pawls into engagement with the teeth of the racks 44 which will have already been brought directly underneath the pawls by the preceding displacement of the main structure. The clamping means are thereby held firmly against the rail car as the car R is inverted to discharge its contents into the hopper 14. FIG. 3 shows the final tipping position after 150° rotation, with the rail car and platform supported solely through the clamping beams 34 and the buffer bar 62. It may be noted that in this position, as when first moving from the initial rest position, the weight of the rotary structure and the rail car remain supported directly through the main beam 16 and its pivot supports 10, 18.

The rail car remains clamped by the beams 34 during the return movement of the tippler from the fully inverted position, until it comes close to the final rest position. At this stage the reducing angle of tilt of the structure brings the heel of the arm 48 of the pawl that is leading in this direction of movement against the fixed bar 50, so pivoting the pawl out of engagement with the rack 44. An integral extension 48a on that pawl arm contacts the arm of the trailing pawl of the pair and so causes that second pawl to disengage from the rack at the same time. The clamping beams then return automatically to their raised positions due to the gravity forces on the carrier and clamping beam assembly. By means of a known form of support comprising V-block 72 and roller and incline 74, 76 the platform is securely located on the weighbridge as the tippler reaches the position shown in FIGS. 1 and 2, ready for the emptied rail car to be replaced.

The tippler illustrated is able to handle rail cars of widely differing heights as exemplified by the maximum and minimum profiles R', R" shown in FIG. 2. This is largely a result of the pivoting of the clamping beam carrier 32 through pivots 30 fixed on the main beam 16 above the tipping axis. The pawls 42 will adopt different final positions, as will be clear from FIG. 4 showing the smallest rail car R" fully tipped, but the relative positions of the tipping axis and the axis of the pivots 30 ensure that the range of final positions required to lock the clamping beams in place is accommodated within a moderate length of the rack 44.

One notable feature of the illustrated example is that the height of the main structure tipping axis defined by the supports 10 is relatively low in comparison with conventional open-sided tipplers. The loaded wagon is lifted a smaller distance because of this, so that less power is needed to tip its contents. At the same time, the final tipped position of a rail car is further displaced laterally as compared with the conventional tippler, so that it is possible while using relatively light gauge material to accommodate the rigid form of box beam illustrated; this not only carries the bending loads of the loaded rail car and platform but is also sufficiently stiff in torsion to transmit the drive from one end plate to the opposite end plate, thereby saving over the costs of a drive transmission to both ends of the rotary structure that would be required in a conventional tippler. In addition, because the lift of the loaded rail car is less, it is possible to use less ballast to even out the power loading in operation, so that less power is needed to drive the tippler.

Another consequence of the lower tipping axis is that the area swept by the tippler as it is pivoted has a lateral extent that projects only a very small distance beyond the rail car gauge, so that the side arm charger can be positioned close to the rail car and the length of its side arm kept small. Because of the large bending loads the side arm must accept this results in a significant cost reduction as well as a saving of space, and the smaller side arm can be swung more quickly into and out of engagement with the rail car so that the cycle operation time can be reduced.

In the illustrated example, the height of the tipping axis is such that, with respect to the top plane of the rails on the platform and the point of intersection in that plane of a vertical from the outer edge of the platform, i.e. that the lateral edge of the platform further from the tipping axis defined by the bearing blocks 10, the axis subtends an angle of substantially 16°. The advantages outlined above, can be obtained to a greater or lesser extent with larger angles, e.g. up to 20°-25°, but are less evident when the angle exceeds some 30°.

Figure 5:
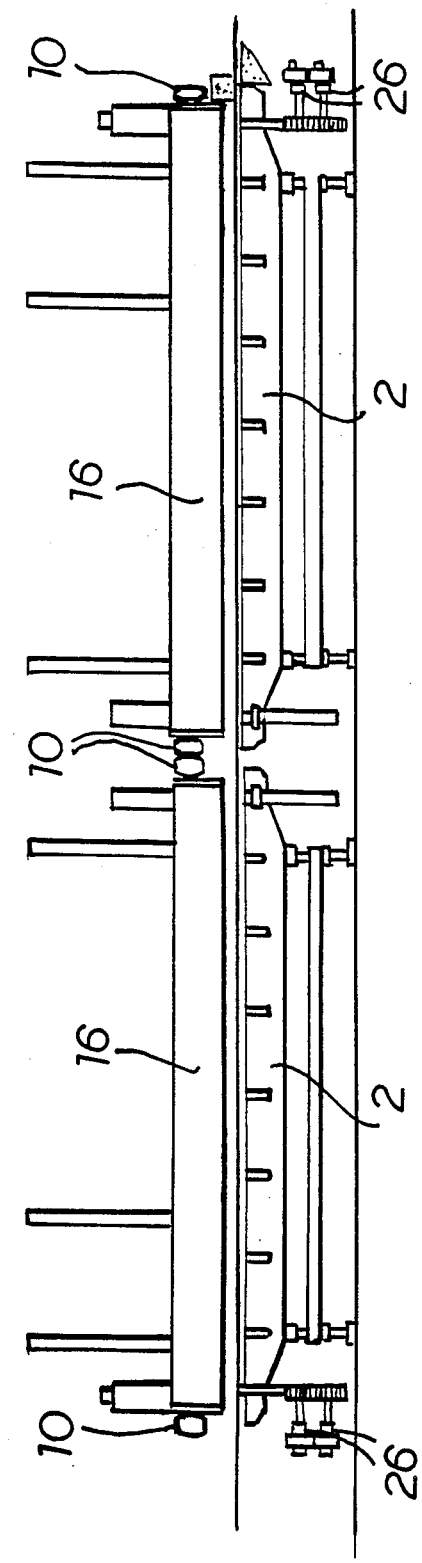
FIG. 5 shows a side view of a second embodiment of the invention with two tipplers in tandem.

As a further consequence of the lateral displacement undergone by the inverted platform, together with the support of the rotary structure through pivot mountings fixed directly to a main longitudinal beam, the hopper entry can be extended beyond the end plates. It is therefore possible to shorten the length of the tippler producing further savings (in the illustrated example all the above-ground structure is kept within the length of the rail car platform). This means that a rail car can be positioned at or close to the very end of the tippler and that it is possible as shown in FIG. 5 to use two such tipplers in tandem in order to empty a pair of coupled rail cars simultaneously, a mode of operation that brings obvious savings but is not possible with conventional open-sided tipplers. Such an arrangement is particularly simple when, as in the illustrated arrangement, the drive of each tippler is at one end only, the drives of the tamdem tipplers then preferably being located at their mutually remote ends. The tipplers can otherwise have the constructional features already described and shown and further illustration will not be needed by those skilled in the art.

I claim:

1. An open-sided rail car tippler comprising a tipping structure, rotary mounting means for said structure at opposite ends thereof defining a rotary tipping axis for the structure, a rail car platform disposed in said structure, rails on said platform for a rail car, means for rotating the structure on said mounting means for tipping the platform with a rail car on it including at least one drive transmission element and at least one drive means for engaging said element, and top clamping means carried by the structure for holding the rail car on the platform when tipped, the tipping structure comprising a main longitudinal beam extending in the direction of said tipping axis, and fixedly connected to said drive transmission element, pivot bearing means at opposite ends of said beam engaging said rotary mounting means, said main beam transmitting the weight of the structure and the rail car through said bearing means to the rotary mounting means, pivot means fixed to said main beam holding the top clamping means, said pivot means defining a pivoting axis for the top clamping means, said pivot means defining a pivoting axis for the top clamping means for displacing said clamping means towards the rail car platform to bring the clamping means into engagement with the rail car and being disposed above the tipping axis of the main beam rotary mounting means when the tippler is at rest.

2. A tippler according to claim 1, wherein said device means engaging said element applies to the main beam at one end a driving torque for tipping said structure.

3. A tippler according to claim 1, wherein the top clamping means comprise a cross-member extending longitudinally of the main beam and pivoted thereon through said pivot means defining the pivoting axis for the top clamping means, a plurality of carriers fixed to said cross-member, a respective top clamping beam for each said carrier, pivot mounting means between each said beam and its carrier defining a pivot axis for the beam parallel to said cross-member pivot axis.

4. A tippler according to claim 3, wherein said drive means includes at least one transversely projecting end plate secured to the main beam at an end region thereof and further including a locking means between said cross-member and said at least one end plate for fixing the top clamping means non-rotatably to the main beam when the clamping beams clamp a tipped rail car.

5. A tippler according to claim 3, wherein respective end plates are provided at opposite end regions of said main beam and the rail car platform has end portions that extend beyond said end plates.

6. An open-sided rail car tippler comprising a tipping structure, rotary mounting means for said structure at opposite ends thereof defining a rotary tipping axis, a rail car platform disposed in said structure and operating means for rotating the structure on said mounting means for tipping the platform with a rail car on it, said operating means being disposed at least partly above the level of the rail car platform, said tipping structure comprising a main beam extending between and supported on said rotary mounting means, and end members fixedly connected to and projecting transversely from opposite ends of said main beam lying within the span of said rotary mounting means, a plurality of top clamping beams carried by said main beam for holding the rail car on the platform when it is tipped, pivot connection means fixed on said main beam providing a common pivot for said top clamping beams on an axis parallel to and displaced from the tipping axis, and the rail car platform spanning essentially the distance between said rotary mounting means, said rotary tipping structure and said operating means above rail car platform level being contained within the length of the rail car platform.

7. An open-sided rail car tippler comprising a tipping structure including a main supporting beam, a rail car platform disposed in said structure, rails on said platform for a rail car, rotary mounting means for said beam at opposite ends thereof defining a longitudinal pivot axis for tipping discharge of a rail car on the platform, top clamping means displaceably mounted on said structure for engaging the top of the rail car to hold it on the platform when the structure is tipped, said tipping axis being disposed above the plane of the rails on the rail car platform and being laterally offset from the rail car platform whereby opposite lateral edges of the platform lie respectively nearer to and further from the tipping axis, said axis being located in a plane passing through the plane of said rails at the intersection of the latter plane with a vertical from a lateral edge of the platform further from the tipping axis, said plane containing the tipping axis subtending an angle from the horizontal less than 30°.

8. A tippler according to claim 7, wherein said angle is less than 25°.

9. A tippler according to claim 8, wherein said angle is less than 20°.

10. A rail car tippler installation comprising an open-sided rail car tippler structure including a main beam, a rail car platform disposed in said structure, pivot mountings at longitudinally opposite ends of said beam supporting said structure and defining a tipping axis laterally offset from said platform, end plates on said beam at opposite end regions of the rail car platform, top clamping means mounted in said structure for movement towards the platform to hold a tipped rail car on the platform, and cooperating locking means between said end plates and said clamping means for securing the clamping means in an operative holding position when the tippler is tipped, a hopper for receiving the contents of a tipped rail car on said platform, said hopper being disposed to the opposite side of said tipping axis to that of the rail car platform and an entry opening of said hopper overlapping said tippler structure end plates and extending longitudinally of the tippler as far as said pivot mountings.

11. A tippler installation according to claim 10, wherein foundations supporting the pivot mountings of the tippler overhang the entry opening of the hopper in the direction of the tipping axis.

12. A tippler installation according to claim 10, wherein two tipplers are disposed in tandem with a common tipping axis and respective drive means for the two tipplers are disposed at their mutually remote ends.

13. A pair of rail car tipplers according to claim 1, said tipplers being disposed in tandem with a common tipping axis and respective drive means for the two tipplers being disposed at their mutually remote ends.

* * * * *